Figure 1:
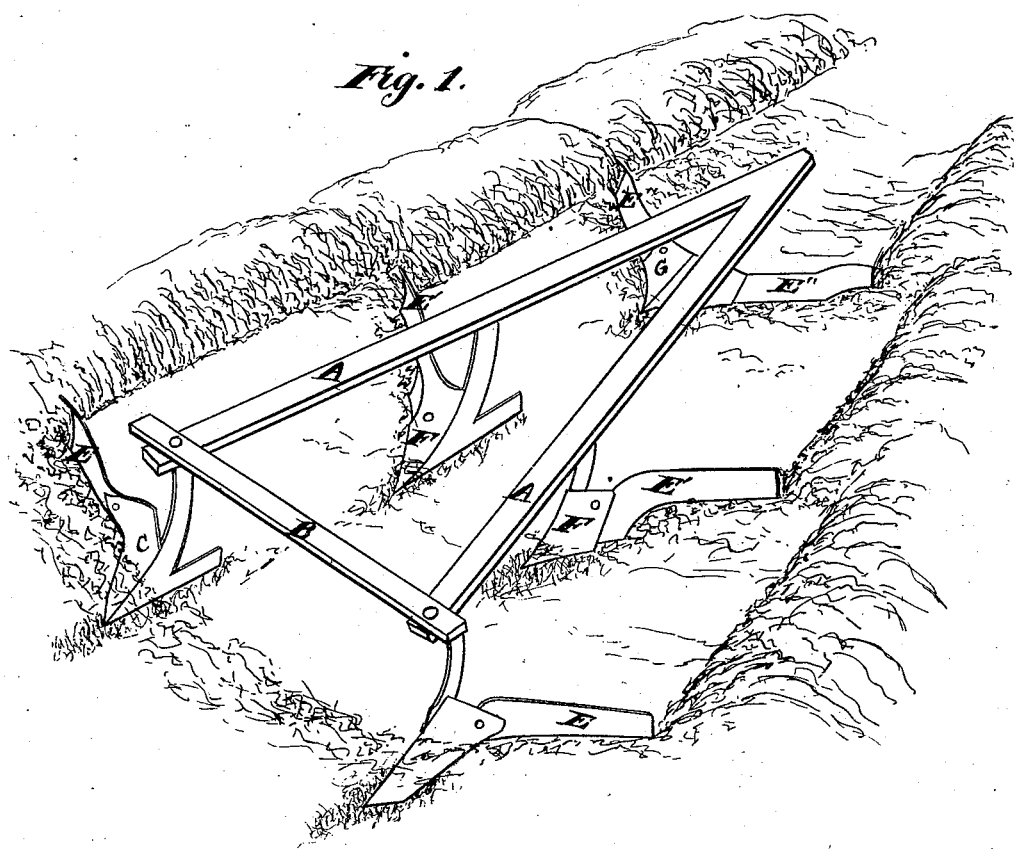

W. B. HYDE.
Ditching and Embanking Machines.

No. 155,309. Patented Sept. 22, 1874.

Witnesses
John L. Bome
C. M. Richardson

Inventor
William B. Hyde
by Dewey & Co.
Attys

UNITED STATES PATENT OFFICE.

WILLIAM B. HYDE, OF OAKLAND, CALIFORNIA.

IMPROVEMENT IN DITCHING AND EMBANKING MACHINES.

Specification forming part of Letters Patent No. 155,309, dated September 22, 1874; application filed August 26, 1874.

*To all whom it may concern:*

Be it known that I, WILLIAM B. HYDE, of Oakland, Alameda county, State of California, have invented an Improved Ditching and Embanking Machine; and I do hereby declare the following description and accompanying drawings are sufficient to enable any person skilled in the art or science to which it most nearly appertains to make and use my said invention or improvement without further invention or experiment.

My invention relates to an improved machine for excavating shallow ditches of greater width than the width of a single mold-board, and at the same time conveying the excavated earth to the outside of the ditch, so as to form an embankment either upon one or both sides of the ditch.

My invention consists in arranging two or more plows diagonally to the line of travel, so that each plow will cut its furrow in the manner of a gang-plow; but, instead of simply turning the furrow over, each plow is provided with a wing or side scraper, which forces the earth out of the excavation and deposits it upon the bank of the ditch, where it is left to form an embankment.

In order to more fully describe my invention, reference is had to the accompanying drawing, forming a part of this specification, in which—

Figure 1 is a perspective view of my machine.

A A represent two timbers, which are connected together in the form of a V, and suitably braced by one or more cross-timbers, B, to give them the required rigidity.

Before proceeding to further describe my machine I will state that I employ the widest part of this V-frame as the front end of the machine, while the apex forms the rear end, the direction of travel being the reverse of the ordinary gang-plow or cultivator having this style of frame.

To each of the timbers A I attach an equal number of plows, as many being employed as desired, according to the width of the proposed ditch. The outer edge of the mold-board of the front plow C on each timber is formed with an angle to correspond with the desired slope of the bank of the ditch to be constructed, and these two plows, being opposite each other at the widest end of the V-frame, will cut the two outside trenches or furrows in starting the ditch. These plows have each a side wing or scraper, E, secured to them at an angle, so as to form an extension of their mold-boards. These wings or scrapers are attached to the mold-board at the proper height to move along the surface of the ground when the plow is turning its furrow, so that the earth which is excavated or turned up by the plow will be forced by the scrapers outward to their extremities, where it is left in a line alongside of the furrow. The next two plows F, being closer together on account of the narrowing of the plow-frame, will cut a furrow inside of the narrow trench which the first plow, C, leaves, and these two plows are each provided with a scraper, E', similar to the scrapers E of the plows C, only they are made wide enough near the mold-board to scrape across the bottom of the furrow of the first plow, and convey the earth which is turned by the second plows across the first trench and out to near where the first line of earth is deposited. These scrapers E' are shorter than the scrapers E, so that the second line of earth is deposited just inside of the first line.

The following pairs of plows are constructed in the same manner, each pair cutting a furrow inside of the furrow which is cut by the preceding plows and their scrapers, conveying the earth across the excavation already made, and out upon the bank, until the last plow, G, at the apex or rear of the frame, which is a double plow, cuts the middle strip and its wings E'' remove the earth in the same manner as above described.

The wings or scrapers E E' E'' can be made adjustable, so that their height can be regulated according to the depth of furrow or ditch it is desired to cut; and, by making their outer ends angular, they can be made to crowd the excavated earth into a single heap, and also form the inner side of the embankment.

Any style of ditching-plow can be used for turning the furrow.

In some instances it may be desirable to construct a water-ditch by simply throwing up two embankments at the proper distance apart, so that the water can be made to flow between the banks and upon the ordinary ground surface. In this case the earth for forming the embankment is taken from the outside and thrown to the inside. To construct this kind of a ditch I employ two ditching-plows, one for each embankment, and, instead of using a V-frame, I use a single beam, properly mounted, so as to stand at an angle to the proposed line of embankment, and provide each beam with two or more plows, arranged in the same manner as the plows upon either of the beams A of the V-frame above described, so that the earth which is turned up by the plows will be forced upon the bank inside of the trench which is excavated by the plows.

This machine can be operated by any suitable power, although I shall use a steam traction-engine in my operations. This machine will also be valuable in the construction of roads where it is desired to construct a ditch and embankment for drainage purposes.

Having thus described my invention, what I claim, and desire to secure by Letters Patent, is—

1. A ditching and embanking machine composed of one or more timbers, A, arranged to move diagonally to the proposed line of embankment, and having two or more plows, C F G, each of said plows being provided with a scraper, E E' E'', substantially as and for the purpose above described.

2. In combination with the plows C F G of a ditching-machine, the wings or scrapers E E' E'', arranged to convey the earth turned by each plow successively to the outside of the ditch, and deposit it in a line to form an embankment, substantially as above described.

In witness whereof I hereunto set my hand and seal.

WILLIAM B. HYDE. [L. S.]

Witnesses:
J. L. BOONE,
C. M. RICHARDSON.